Aug. 22, 1961  A. E. HEFLIN  2,996,757
APPARATUS FOR MAKING PICTURE PLAQUES AND BOOK COVERS
Filed May 21, 1959  2 Sheets-Sheet 1

INVENTOR.
ALBERT E. HEFLIN

*Strauch, Nolan + Neale*
ATTORNEYS

Aug. 22, 1961   A. E. HEFLIN   2,996,757
APPARATUS FOR MAKING PICTURE PLAQUES AND BOOK COVERS
Filed May 21, 1959   2 Sheets-Sheet 2

INVENTOR.
ALBERT E. HEFLIN
BY
*Strauch, Nolan & Neale*
ATTORNEYS

2,996,757
APPARATUS FOR MAKING PICTURE PLAQUES AND BOOK COVERS
Albert E. Heflin, 3145 D Ave., National City, Calif.
Filed May 21, 1959, Ser. No. 814,795
5 Claims. (Cl. 18—5.1)

This invention relates to three dimensional reproductions useful as plaques and baby book covers, and more particularly, to a novel apparatus for preparing such reproductions.

It is common practice for parents of small children to maintain logs of their children's childhood to serve as a memento either for themselves or for the children. In the light of this practice, baby books of one type or another are a fairly popular commodity. Such baby books, in addition to having a suitable title on their front covers, are often embellished with an appropriate design, usually depicting some childhood activity or symbol or perhaps including a picture of a young child, such as in Design Patent No. 51,091.

Other parents, desiring a more graphic memento of their child's babyhood, utilize a different medium to serve the purpose. For example, a permanent impression of a child's hand has been taken in a clay slab and the clay subsequently fired and tinted to serve as a permanent tile or plaque. The latter technique has been extremely popular and has even been used to make permanent impressions of an infant's hands.

In the past, attempts have even been made to combine certain of the advantages of each of the above techniques for preserving mementoes of the child's babyhood, such for example as the application of the baby's hand and footprint to a suitably provided page in a baby book. Such attempts have been restricted, however, to the preparation of two-dimensional inserts in the baby book. Three-dimensional reproductions of the baby's hands and feet have not been used in conjunction with baby books due to the obvious prior art difficulties in applying three-dimensional techniques to use in a baby book.

It is accordingly an object of the instant invention to provide a novel plaque or baby book cover containing a detailed and accurate three-dimensional reproduction of a child's hands and feet and which may be manufactured easily and at reasonable cost.

It is an object of the instant invention to provide novel apparatus for fabricating a three-dimensional facsimile of a child's hands and feet by means of an explosive forming technique, said apparatus being of simple and inexpensive construction.

These and other objects of the instant invention will become more fully apparent as the description proceeds in connection with the accompanying drawings in which.

Figure 1:
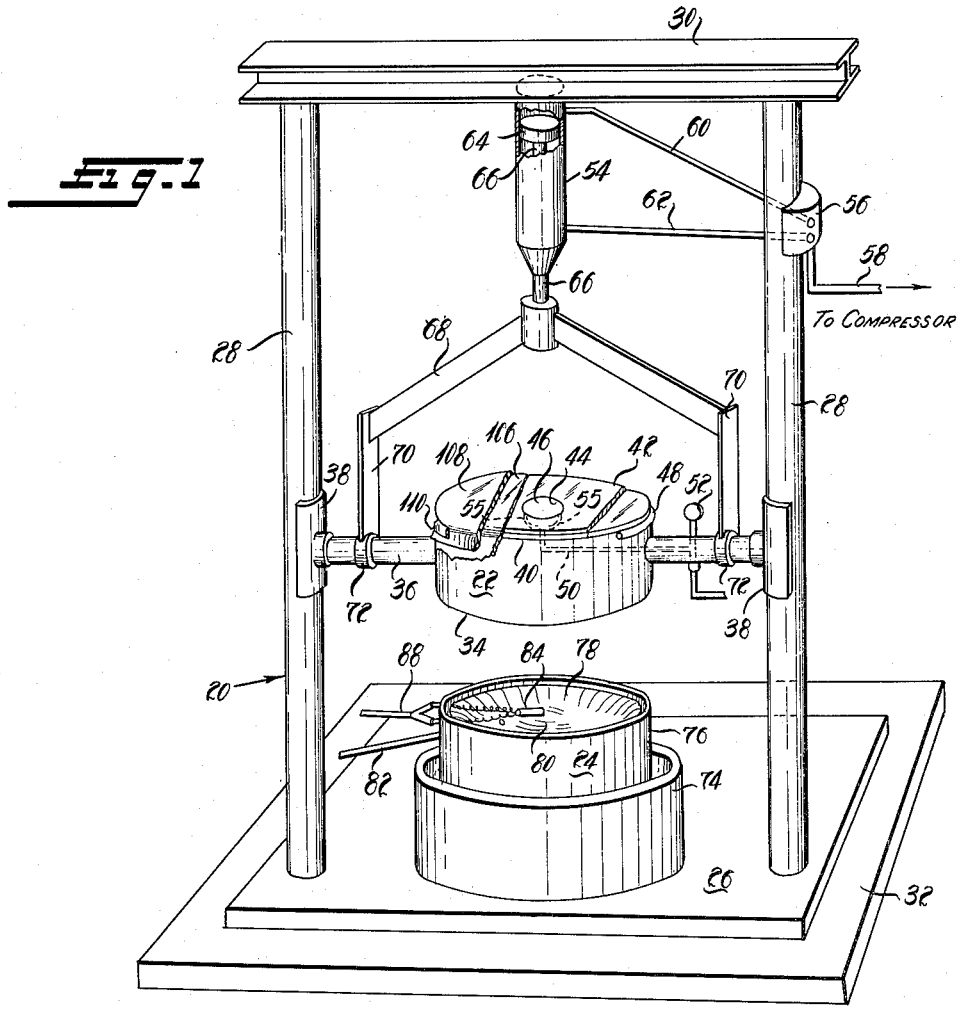
FIGURE 1 is a pictorial drawing showing the novel explosive forming apparatus of the instant invention.
Figure 6:
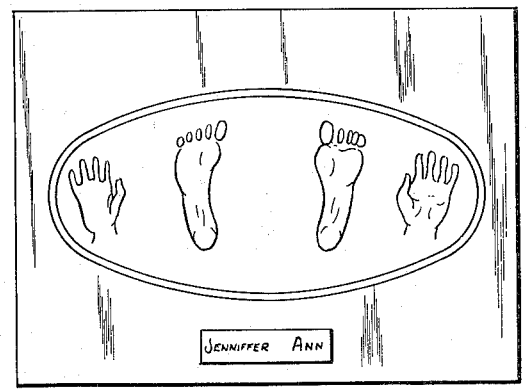
FIGURE 6 is a plan view showing a finished baby book cover made in accordance with the instant invention.

The invention may best be understood by first describing the novel explosion forming apparatus which is used to fabricate the three dimensional reproduction. As shown in FIGURE 1, the apparatus basically comprises a frame 20, an upper die-mounting unit 22 (which is vertically adjustable on frame 20) and a lower explosion chamber assembly 24, the entire apparatus being located in a sound-proof room (not shown).

Frame 20 consists of a metal base 26, two tubular slide members 28 fixed to said metal base and a horizontal connecting member 30 which, as shown in the drawing, may suitably consist of an I-beam which is welded to the uppermost ends of slide members 28. Base 26 is positioned on cushion pad 32, which is adapted to serve as a shock absorber for the entire structure.

Upper die-mounting unit 22 comprises a metal cylinder 34 which is rigidly fixed to a hollow axle 36 which passes horizontally through the central portion of the cylinder and which is journalled for rotation in U-shaped brackets 38, the latter being mounted for vertical sliding movement on slide members 28. Rigidly secured to and completely covering the top end of cylinder 34 is a steel plate 40 having an approximate thickness of one inch. Positioned atop plate 40 is a rubber pad 42 which, except for a cut-out portion 44 for receiving a die 46, completely covers plate 40. An annular bead 48 is fixed around cylinder 34 nearest its uppermost edge. A vacuum line 50, which is provided with a suitable vacuum gauge 52, passes from a vacuum source (not shown), through the hollow of axle 36 to its approximate center, and vertically up through cylinder 34 and through an aperture in plate 40. If desired, vacuum line 50 may terminate, near the point at which it approaches plate 40, in a branched section having a plurality of conduits 55 which pass through plate 40 and which are adapted to be connected to vacuum ducts in die 46. Surrounding axle 36 and vacuum line 50 within cylinder 34 and completely filling said cylinder is a suitable filler material (such as sand or concrete).

A double-acting cylinder 54 is secured to horizontal connecting member 30 at its approximate center and is connected with a control panel 56 by means of conduits 60 and 62. Air line 58 supplies air under pressure from a compressor (not shown) for operating on the respective upper and lower sides of piston head 64 in said cylinder in a conventional manner. Piston rod 66 extends downwardly out through the bottom end of cylinder 54 and is connected at its lowermost end to yoke 68. Yoke 68 is provided with arms 70 carrying bushing type mountings 72 in which axle 36 is journalled for rotation.

Situated below cylinder 34 on base 26 is a large metal overflow container 74. Within container 74 and projecting upwardly and outwardly therefrom is a lower metal cylinder 76, the diameter of which is identical to that of cylinder 34. Lower cylinder 76 is substantially filled with a suitable filler material (such as sand or concrete), at least the upper surface of which is preferably concrete having a depression 78 of parabolic configuration so as to form an explosion chamber 80. A water pipe 82, which is connected to a suitable water source (not shown), passes through the wall of lower cylinder 76 and filler to communicate with explosion chamber 80. Centrally positioned in explosion chamber 80 is a mounting cavity 84 for an electric blasting cap, said mounting cavity being suitably connected to a power source through electric power line 88. Lower cylinder 76 is so positioned relative to cylinder 34 that when the latter is pivoted through 180° about its horizontal axis and lowered into contact with the former, the peripheral walls of each of the cylinders will mate into substantially sealing relationship.

If desired, cylinder 34 may be manually rotatable in U-shaped brackets 38 and bushings 72 as by means of a suitably provided crank and lock mechanism (not shown) to lock the cylinder in any desired position. Alternatively, axle 36 may be provided with a pinion (not shown)

which may be placed in engagement with a rack (not shown) so that as cylinder 34 is raised or lowered, the cylinder will automatically pivot about its horizontal axis through an arc of 180°. The rack and pinion can be so adjusted that metal cylinder 34 will have traversed an angle of 180° before it comes it comes into contact with lower cylinder 76.

Details of die 46, used in conjunction with the apparatus described above, are best shown in FIGURES 4 and 5. Die 46 in its illustrated form is elliptical in shape and is centrally recessed sufficiently to receive four male plaster casts 90. The die, which may advantageously be constructed of aluminum, consists of a base 92, sloping sides 94, a rim 96 and a centrally recessed portion 98. Ducts 100 are provided at the periphery of recess 98 and serve to establish communication between said recess and vacuum lines 50 (see FIGURE 1) when die 46 is in position on upper die-mounting unit 22. Annular insert 102, having an outer face which is parallel to sloping wall 104 of recess 98 and an inner face which is tapered upwardly, is removably positioned over ducts 100 in said recess as shown in FIGURE 5. The function of insert 102 will become more fully apparent in the ensuing description.

While the particular dimensions of the die 46 will vary depending upon the nature of the final product desired, the relative dimensions of the die elements should be such that when male plaster casts 90 are positioned on clay strips 106 on surface 99 in recess 98, the tops of said plaster casts will lie in a horizontal plane approximately 1/8 inch from the apex of rim 96. A die which has been found to be particularly useful to applicant has the following dimensions: total height (from base 92 to the apex of rim 96)—1 1/8"; depth of recess 98 (from the apex of rim 96 to the upper surface 99 of base 92 of recess 98)—5/8"; height of rim 96 (from the apex of the rim to ledge 101)—3/16".

Figure 2:
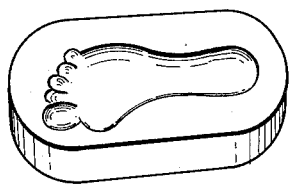
FIGURE 2 is a pictorial drawing of a clay mold containing an impression of a child's hand and which is adapted for use in the novel process and apparatus of the instant invention.
Figure 3:
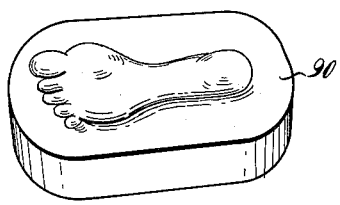
FIGURE 3 is a pictorial drawing of a plaster cast made from the clay mold of FIGURE 2.

The method of fabricating the three dimensional reproduction of the instant invention is as follows: Impressions of the child's hands and feet are taken in clay slabs of about one-half inch thickness, one impression per slab. A clay slab bearing such an impression is shown in FIGURE 2. A male plaster cast such as is shown in FIGURE 3 is then prepared using the impression-bearing clay mold described above. This may be conveniently accomplished by placing the clay mold in a suitable receptacle having walls projecting upwardly from the sides of said mold and pouring plaster into the recess formed by said walls and by the mold surface. The male plaster cast is preferably approximately one-half inch in thickness.

Figure 4:
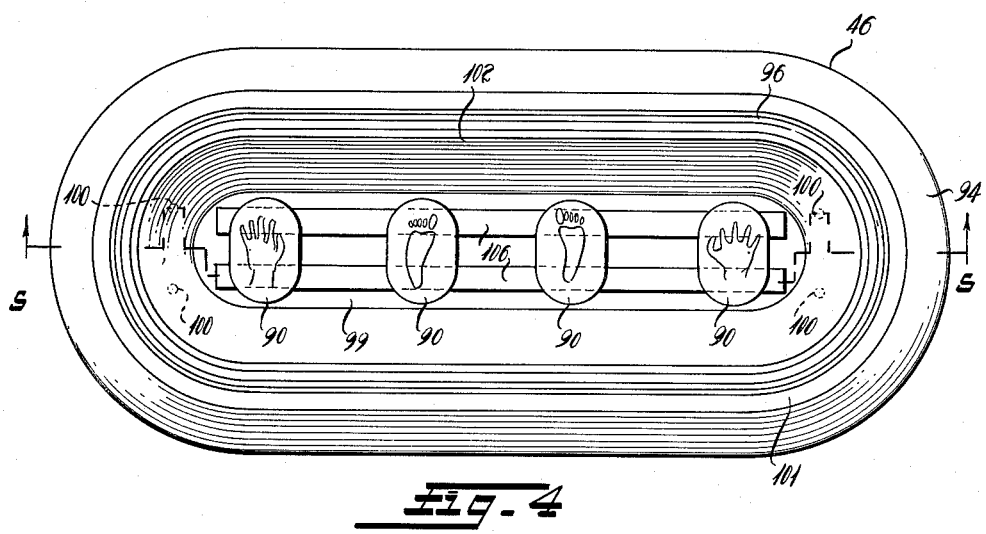
FIGURE 4 is a plan view showing four plaster castings such as that shown in FIGURE 3 in position in a die.
Figure 5:
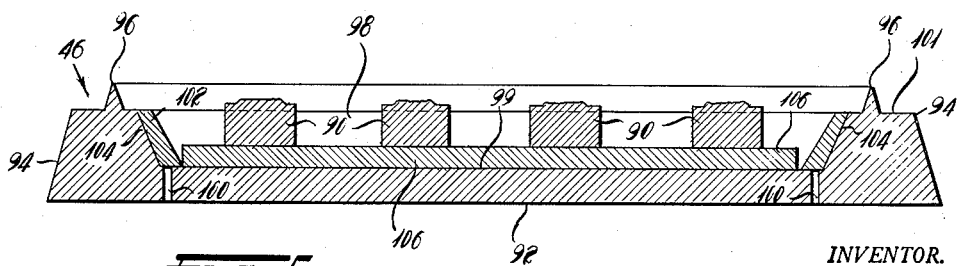
FIGURE 5 is a cross-sectional view in elevation taken along lines 5—5 of FIGURE 4.

Two long strips of soft clay 106 are then placed along the major axis of the elliptical die 46 and annular insert 102 placed in recess 98 of the die (see FIGS. 4 and 5). The four male plaster casts are then placed in the desired arrangement on the clay strips 106, such, for example, as shown in FIG. 4. The male plaster casts of FIGURE 3 are pressed into the clay strips sufficiently so that their top faces (which face upwardly) will be approximately one-eighth inch from the apex of rim 96 (see FIG. 5).

With the male plaster casts in position in the die as set forth above, sufficient plaster (i.e., plaster of Paris) is poured into recess 98 to fill it up to the level of the top face of the male plaster casts. While the plaster is hardening, the surface of the plaster around the male plaster casts may be troweled to provide a desired background effect. After the plaster has hardened, the plaster assembly is removed from the mold and touched up as desired. After removing annular insert 102 from die 46, the plaster assembly is placed back in the die, after which the die is ready for use in the explosive forming machine described above.

Since the inner face of annular insert 102 tapers upwardly, as explained above, the edge of the plaster assembly will slope sufficiently to leave ducts 100 exposed and in communication with the top faces of male plaster casts 90. If desired, of course, the edges of the plaster assembly may be trimmed to further assure such communication.

The operation of the novel explosive forming machine of the instant invention is as follows: Before use the explosive forming machine is in the polition shown in FIGURE 1. The first step involves the placing of die 46 on plate 40 in the opening formed in rubber pad 42. The die is so positioned on plate 40 that vacuum line(s) 50 extend up and into vacuum ducts 100 in the die. A thin copper sheet 106 (i.e., approximately 0.002" thick), of sufficient size to project approximately one inch beyond rim 96 of the die, is centered and placed atop the die. A blanket 108 of approximately 1/16" thickness and made of high-grade neoprene or like material is then placed over the copper sheet, the edges of said blanket projecting slightly beyond annular bead 48. The neoprene blanket is secured in place by a suitable clamping means, such as a heavy elastic band 110 pulled tightly around the top edge of cylinder 34, said band being retained on said cylinder by means of annular bead 48. A flat iron sheet (not shown) is placed over the neoprene sheet and pressed downwardly against rim 96 of die 46 by any suitable means to serve as a die ring to prevent the copper sheet from wrinkling in the rim area of the die.

A vacuum is drawn between the top of the plaster assembly in die 46 and the copper sheet through vacuum line 50. The effect of the vacuum is to draw the neoprene and copper sheet against the top face of the plaster assembly and to partly form the copper sheet about the male plaster casts therein. After this initial forming operation, the iron sheet is removed. A suitable explosive (not shown), such as a No. 6 Atlas Powder Co. or Hercules Powder Co. electric blasting cap, is then positioned in mounting cavity 84 in lower cylinder 76. Cylinder 34 is next rotated through 180° about hollow axle 36 so that die 46 is positioned between said cylinder and lower cylinder 76. Compressed air is then forced through conduit 60 into cylinder 54, thus forcing piston rod 66, yoke 68 and upper die-mounting unit 22 downwardly. If the upper die-mounting unit is provided with a pinion and rack as described above, of course, the upper die-mounting unit need not be rotated through 180° in an operation separate from the application of air pressure to cylinder 54 since the former will automatically be rotated through 180° as it is lowered. Sufficient air pressure is applied to cylinder 54 to force rubber pad 42 on cylinder 34 tightly against and in sealing relationship with the upper rim of lower cylinder 76.

Explosion chamber 80 is then filled with water through water pipe 82, any water seepage through the cylinder 34-cylinder 76 interface being caught by overflow container 74. The soundproof room in which the entire apparatus is situated is sealed and electric blasting cap 84 then detonated.

Following the detonation, air pressure is applied through conduit 62 to the underside of piston head 64 in cylinder 54, pushing upper die-mounting unit 22 upwardly away from lower cylinder 76. In the event cylinder 34 is only manually pivotable about hollow axle 36, said cylinder is preferably not turned upright until such time as piston head 64 reaches its upper limit of movement. If a rack and pinion structure is provided as above described, however, cylinder 34 will automatically be righted in the course of its upward movement.

When cylinder 34 has reached its upper limit of movement and has been pivoted 180° to its upright position, the vacuum which had originally been drawn through vacuum line 50 is cut and elastic band 110 and neoprene blanket 108 are removed from cylinder 34. Die 46 is then removed from upper die-mounting unit 22 and the formed copper foil stripped from the face of the die.

To preclude the possibility of deformation of the formed copper foil, a suitable plastic material is poured onto the back surface of the copper and allowed to harden. The plastic-backed copper is then oxidized and well polished to impart the desired warmth to the finished product and to highlight the impressions, and mounted in a conventional manner on a suitably embellished cardboard backing member. This backing member, which may be covered with a suitable material such as leather, velvet, etc., is then mounted on the front of a baby book, rendering the baby book complete and ready for sale. Alternatively, the covered backing member bearing the three dimensional reproductions may serve as a plaque.

The finished product is sturdy, permanent, and serves as a beautiful memento of a child's babyhood.

The invention may be embodied in other specific forms without departing from the spirit or essential characteristics thereof. For example, while in the above-described preferred method a vacuum is drawn between the plaster assembly and copper foil before detonation of the blasting cap, this step may be omitted, if desired, though the impressions obtained will lack the fine detail obtainable through use of a vacuum.

Though die 46 has been described as being elliptically shaped, its shape serves an ornamental rather than a functional purpose and may therefore be varied at pleasure.

Copper foil has been described as the impression-receiving material, but it is clear that other materials, such as silver or the like, may be substituted therefor. Furthermore, though foil of .002" thickness has provided excellent results, the foil thickness may vary within reasonable limits, .005" foil having produced satisfactory results in the past.

Furthermore, while the blasting cap has been described as being secured within explosion chamber 80, it is possible, though not preferred, to suitably secure the cap to upper die-mounting unit 22.

The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

When used in the specification and claims, the phrase "at least one of the hands and feet" is meant to include as few as one and as many as all of the hands and/or feet.

What is claimed and desired to be secured by United States Letters Patent is:

1. Apparatus for explosive forming comprising: a first tank substantially filled with a solid filler material and having an open top, said filler material having a depression therein for receiving a body of water; an electric blasting cap positionable in said depression within said body of water; a second tank filled with a solid filler material, said second tank having means for mounting a die on its top surface and being mounted for pivotal movement through at least 180° about a horizontal axis, said second tank being movable vertically and being positioned over said first tank in such a manner that when said second tank is rotated about its horizontal axis through 180° and lowered into contact with said first tank, the die on the top surface of the second tank will be substantially immersed in said body of water and said first and second tanks will be in substantially sealing relationship.

2. The apparatus of claim 1 wherein said first and second tanks are filled with concrete.

3. The apparatus of claim 1 including means for drawing a vacuum in the die.

4. The apparatus of claim 1 wherein said depression in said concrete is of substantially parabolic cross-section.

5. Apparatus for explosive forming comprising: a first cylinder substantially filled with concrete and having an open top, said concrete having a centrally located depression for receiving a body of water; an electric blasting cap positionable in said depression within said body of water; a second cylinder filled with concrete and having a steel plate mounted on its top; said steel plate being adapted to permit the mounting of a die atop said second cylinder; said second cylinder being mounted for pivotal movement about a horizontal axis through at least 180° and being movable vertically, said second cylinder further being positioned over said first cylinder in such a manner that when said second cylinder is rotated about its horizontal axis through 180° and lowered into contact with said first cylinder, the die on the top surface of the second cylinder will be substantially immersed in said body of water; and means for maintaining said first and second cylinders in substantially sealing relationship in said last mentioned position.

References Cited in the file of this patent

UNITED STATES PATENTS

| | | |
|---|---|---|
| 1,052,081 | Miltner | Feb. 4, 1913 |
| 1,658,150 | Worobjew | Feb. 7, 1928 |
| 1,914,049 | Smith | June 13, 1933 |
| 1,941,736 | Bogaerts | June 2, 1934 |
| 2,038,304 | Middler | Apr. 21, 1936 |
| 2,149,641 | Temple | Mar. 7, 1939 |
| 2,214,226 | English | Sept. 10, 1940 |
| 2,271,454 | Erdle et al. | Jan. 27, 1942 |
| 2,474,676 | Kelly | June 28, 1949 |
| 2,508,156 | Gillman | May 16, 1950 |
| 2,513,785 | Browne | July 4, 1950 |
| 2,590,221 | Stevens | Mar. 25, 1952 |
| 2,604,042 | Cook | July 22, 1952 |
| 2,641,859 | Albert | June 16, 1953 |
| 2,648,125 | McKenna et al. | Aug. 11, 1953 |
| 2,814,077 | Moncrieff | Nov. 26, 1957 |

FOREIGN PATENTS

| | | |
|---|---|---|
| 83,530 | Denmark | Sept. 23, 1957 |